United States Patent
Bennett

(10) Patent No.: US 8,782,072 B2
(45) Date of Patent: *Jul. 15, 2014

(54) SEARCH ENGINE SUPPORTING MIXED IMAGE AND TEXT SEARCH INPUT

(71) Applicant: Enpulz, L.L.C., Chicago, IL (US)

(72) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,837

(22) Filed: Oct. 29, 2012

(65) Prior Publication Data
US 2013/0054561 A1 Feb. 28, 2013

Related U.S. Application Data

(63) Continuation of application No. 13/465,397, filed on May 7, 2012, which is a continuation of application No. 12/185,804, filed on Aug. 4, 2008, now Pat. No. 8,180,788.

(60) Provisional application No. 61/059,196, filed on Jun. 5, 2008.

(51) Int. Cl.
G06F 17/30 (2006.01)

(52) U.S. Cl.
USPC .......................................... 707/763

(58) Field of Classification Search
USPC ............ 707/763, 999.003, 999.102; 382/100, 382/305, 177
See application file for complete search history.

(56) References Cited

U.S. PATENT DOCUMENTS

| | | |
|---|---|---|
| 4,882,675 A | 11/1989 | Nichtberger et al. |
| 5,239,462 A | 8/1993 | Jones et al. |
| 5,339,392 A | 8/1994 | Risberg et al. |
| 5,729,693 A | 3/1998 | Holda-Fleck |
| 5,732,400 A | 3/1998 | Mandler et al. |
| 5,765,144 A | 6/1998 | Larche et al. |
| 5,797,133 A | 8/1998 | Jones et al. |
| 5,903,721 A | 5/1999 | Sixtus |
| 5,937,391 A | 8/1999 | Ikeda et al. |
| 5,940,811 A | 8/1999 | Norris |
| 5,943,424 A | 8/1999 | Berger |
| 5,963,915 A | 10/1999 | Kirsch |
| 5,984,180 A | 11/1999 | Albrecht |
| 6,009,412 A | 12/1999 | Storey |
| 6,014,645 A | 1/2000 | Cunningham |
| 6,029,149 A | 2/2000 | Dykstra et al. |
| 6,035,061 A * | 3/2000 | Katsuyama et al. .......... 382/177 |
| 6,052,674 A | 4/2000 | Zervides et al. |

(Continued)

*Primary Examiner* — Sathyanarayan Pannala
(74) *Attorney, Agent, or Firm* — Garlick & Markison; Bruce E. Garlick

(57) ABSTRACT

Searching of images by correlating a search image with a plurality of images hosted in Internet based servers by an image search server. The image search server supports delivery of search result pages to a client device based upon a search string or search image, and contains images from a plurality of Internet based web hosting servers. The image search server delivers a search result page containing images upon receiving a search string and/or search image from the web browser. The selection of images in the search result page is based upon: (i) word match, that is, by selecting images, titles of which correspond to the search string; and (ii) image correlation, that is, by selecting images, image characteristics of which correlates to that of search image. The selection of images in the search result page also occurs on the basis of popularity.

28 Claims, 7 Drawing Sheets

(56) References Cited

U.S. PATENT DOCUMENTS

| | | |
|---|---|---|
| 6,055,513 A | 4/2000 | Katz |
| 6,055,514 A | 4/2000 | Wren |
| 6,088,686 A | 7/2000 | Walker et al. |
| 6,141,006 A | 10/2000 | Knowlton et al. |
| 6,141,915 A | 11/2000 | Andersen et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,370,514 B1 | 4/2002 | Messner |
| 6,385,591 B1 | 5/2002 | Mankoff |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,505,773 B1 | 1/2003 | Palmer |
| 6,507,823 B1 | 1/2003 | Nel |
| 6,530,880 B2 | 3/2003 | Pagliuca |
| 6,567,791 B2 | 5/2003 | Lent et al. |
| 6,587,841 B1 | 7/2003 | Defrancesco et al. |
| 6,594,640 B1 | 7/2003 | Postrel |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 | 5/2006 | Martin et al. |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,568 B1 | 9/2006 | Fusz et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,395,259 B2 | 7/2008 | Bailey et al. |
| 7,505,939 B2 | 3/2009 | Lent et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,657,126 B2 * | 2/2010 | Gokturk et al. ............... 382/305 |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,908,226 B2 | 3/2011 | Hutchison et al. |
| 7,938,316 B2 | 5/2011 | Bennett et al. |
| 7,942,316 B2 | 5/2011 | Bennett et al. |
| 8,036,941 B2 | 10/2011 | Bennett et al. |
| 8,117,120 B2 | 2/2012 | Misraje et al. |
| 8,145,563 B2 | 3/2012 | Misraje et al. |
| 8,177,124 B2 | 5/2012 | Bennett et al. |
| 8,180,788 B2 * | 5/2012 | Bennett ........................ 707/763 |
| 8,181,851 B2 | 5/2012 | Bennett et al. |
| 2002/0052778 A1 | 5/2002 | Murphy |
| 2008/0162437 A1 * | 7/2008 | Choi et al. .................... 707/3 |
| 2008/0201356 A1 * | 8/2008 | Jou ............................. 707/102 |
| 2008/0226119 A1 * | 9/2008 | Candelore et al. ........... 382/100 |

* cited by examiner

FIG. 3

SEARCH ENGINE SUPPORTING MIXED IMAGE AND TEXT SEARCH INPUT

CROSS REFERENCES TO RELATED APPLICATIONS

The present application is a continuation of U.S. Ser. No. 13/465,397, filed May 7, 2012, co-pending, which is a continuation of U.S. Ser. No. 12/185,804, filed Aug. 4, 2008, now issued as U.S. Pat. No. 8,180,788, which claims priority under 35 U.S.C. 119(e) to U.S. Provisional Application Ser. No. 61/059,196, filed Jun. 5, 2008, and having a common title with the present application, which is incorporated herein by reference in their entirety for all purposes.

The present application is related to co-pending Utility application Ser. No. 12/185,796 filed on Aug. 4, 2008, now issued, entitled "IMAGE SEARCH ENGINE USING IMAGE ANALYSIS AND CATEGORIZATION", (ENJUS01), which is incorporated herein in its entirety by reference for all purposes.

BACKGROUND

1. Technical Field

The present invention relates generally to Internet infrastructures; and, more particularly, to search engines.

2. Related Art

Search engines form a gateway to the Internet by allowing users to navigate through the World Wide Web in ways that are unparalleled. New manners of searching of web links containing desired content is that of searching for images in the Internet. Image searches allow a user to search for images that may exist anywhere in a plurality web hosting servers in the Internet. Users may search for images with a wide variety of interests such as business, engineering and scientific research as well as home based general interests.

Search engines typically identify an image result list and sort them based upon search keyword (or, search string) hit accuracy (by comparing words of the search string with that of titles of plurality of images in the Internet based web hosting servers) and prior user selection popularity. The image search results are typically displayed in four rows by four columns (or some other combination of rows and columns), with a 'next' button leading to the next image search result page and a 'previous' button leading to a previous image search result page. If a user does not find what he/she were looking for in the first few image search result pages, subsequent pages are unlikely to yield useful results.

Often when they search, they have in mind what they expect to see in images. However, searching for an image results in wide variety of images being displayed, many of them hardly correspond to the user's expectations in searching. Many of the images contain adult content which are not desirable in many instances, such as when children searching for images or when searching in front of an audience. The reason for the results not being what is expected is that the search engines only attempt to match the search string with that of titles of images. Therefore, results become vague, many times even 10 pages of results yield very little user desired images.

Desiring to find images of certain kind of beach houses, for example, a user may enter 'beach houses' as the image search sequence and may receive a long list of images of variety of houses, people in beaches, page after page. Not getting desired results in the initial page, the user may step through several screens via the 'next' button. This again results in many of the same kind of images that were previously unhelpful.

These and other limitations and deficiencies associated with the related art may be more fully appreciated by those skilled in the art after comparing such related art with various aspects of the present invention as set forth herein with reference to the figures.

BRIEF DESCRIPTION OF THE DRAWINGS

FIG. 3 is an exemplary schematic block diagram illustrating snap shot of a first search result page of images containing 'image search', 'adult content filter', 'prev', 'next' buttons, and an 'upload new figure' text box; wherein an image is selectable for further image searches;

DETAILED DESCRIPTION OF THE DRAWINGS

Figure 1:
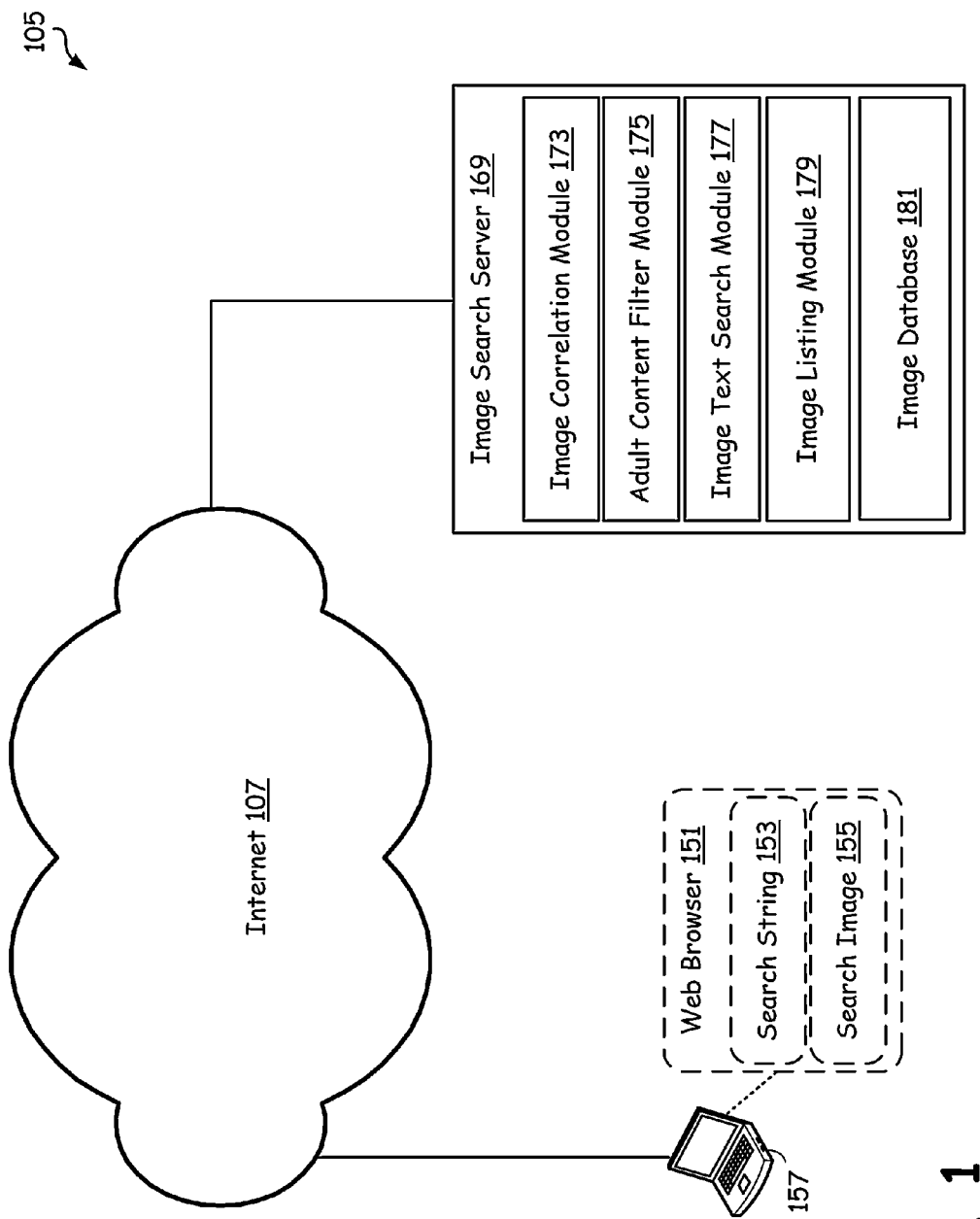
FIG. 1 is a schematic block diagram illustrating an Internet infrastructure containing a client device and (web browser accessible) image search server, wherein the image search server delivers images based upon a search string and search image.

FIG. 1 is a schematic block diagram illustrating an Internet infrastructure 105 containing a client device 157 and (web browser accessible) image search server 169, wherein the image search server delivers images based upon a search string and search image. In particular, in a representative embodiment, the image search server 169 delivers one or more search result pages containing images based upon either or both of a search string 153 and search image 155. The search image 155 may be submitted to the image search server 169, from the client device's 157 web browser 151, by uploading the image in an image search server's (search engine's) web page. Detailed description of an exemplary search engine's web page is provided with reference to the description of snap shot in FIG. 2.

The image search server 169 identifies one or more characteristic parameters of the search image 155 received from the client device's 157 web browser 151. Then, the image search server 169 correlates these characteristic parameter(s) with that or those of a plurality of images in an image database 181. The image search server 169 then selects and prioritizes images based upon closeness in correlation to that of the search image 155, and in some embodiments, on a popularity basis. The image search server 169 also matches one or more words in the search string 153 with that or those of titles of the plurality of images in the image database 181 and selects one or more of a plurality of images.

In addition, the image search server 169 may filter for adult content based upon user settings in the client device's 157 web browser 151. These selected and filtered images are sorted on the basis of correlation/popularity. Then, the image search server 169 delivers a first few of the images selected on the basis of correlation with the characteristic parameter(s) of the search image 155 and first few of the images selected on the basis of match with the search string 153, and delivers a first search result page. The images in the image database 181 are obtained from a plurality of web hosting servers by crawling through them, or by submission from users. Detailed description of the first search result page is provided with reference to the description of web page snap shot in FIG. 3, for example.

The image search server 169 contains an image correlation module 173 that performs correlation processing between characteristic parameter(s) of search image 155 and that of the plurality of images in the image database 181. The correlated images in the image database 181 are given a unique image quotient number that represents the closeness to the search image 155. These image quotient numbers are tabled along with other image related aspects such as image titles and web links, for example, where they were originally located. Then, the table is sorted on the basis of closeness of the images in the image database 181. In addition, in another table the first few images (above a threshold image quotient number, for example) that closely correlate with the search image 155 are again sorted on the basis of popularity. These sorted images may be filtered by an adult content filter module 175, by using digital image correlation. Again, for digital image correlation, the adult content filter module 175 may use sample images (instead of search image 155) with adult content.

An image text search module 177 uses word matching techniques to match one or more words in the search string 153 with that or those of titles of the plurality of images in the image database 181. The matched images in the image database 181 are given a unique text quotient number that represents how closely the word(s) of the search string 153 and the word(s) of the titles of the images in the image database 181 match. These text quotient numbers are tabled along with image titles and web links where they are originally located. Then, the table is sorted on the basis of closeness in match. In addition, in another table the first few images (above a threshold text quotient number, for example) that closely match are again sorted on the basis of popularity. These sorted images may be filtered by the adult content filter module 175, by using word matching techniques. Again, for word matching, the adult content filter module 175 may use sample adult content words.

Based upon the sorting of images and the filtering, in a representative embodiment, four basic tables are formed: (i) sorted on the basis of closeness in correlation to the search image 155; (ii) sorted on the basis of popularity within the first few closely correlated images in (i); (iii) sorted on the basis of closeness in match between the words in the titles of the plurality of images, in the image database 181, to that of search string 153; and (iv) sorted on the basis of popularity within the first few closely matched images in (iii).

Finally, an image listing module 179 lists the images from the four tables (i) through (iv) to form one or more search result pages, each containing a certain portion of each of the tables (i) through (iv). This listing is done in a mutually exclusive manner so that none of the images in any of the search result pages is repeated. Then, the image search server 169 delivers a first of these search result pages containing a first few search results of each of the tables (i) through (iv), followed by subsequent search result pages.

Figure 2:
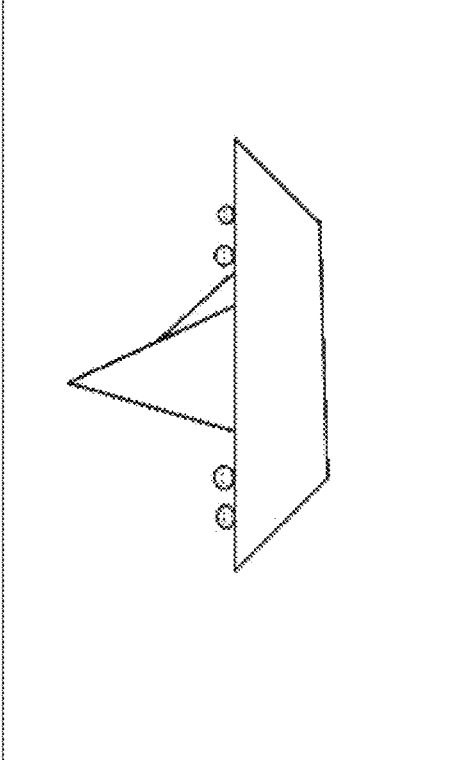
FIG. 2 is an exemplary schematic block diagram illustrating snap shot of an image search page containing 'image search' and adult content filter buttons.
Figure 3:
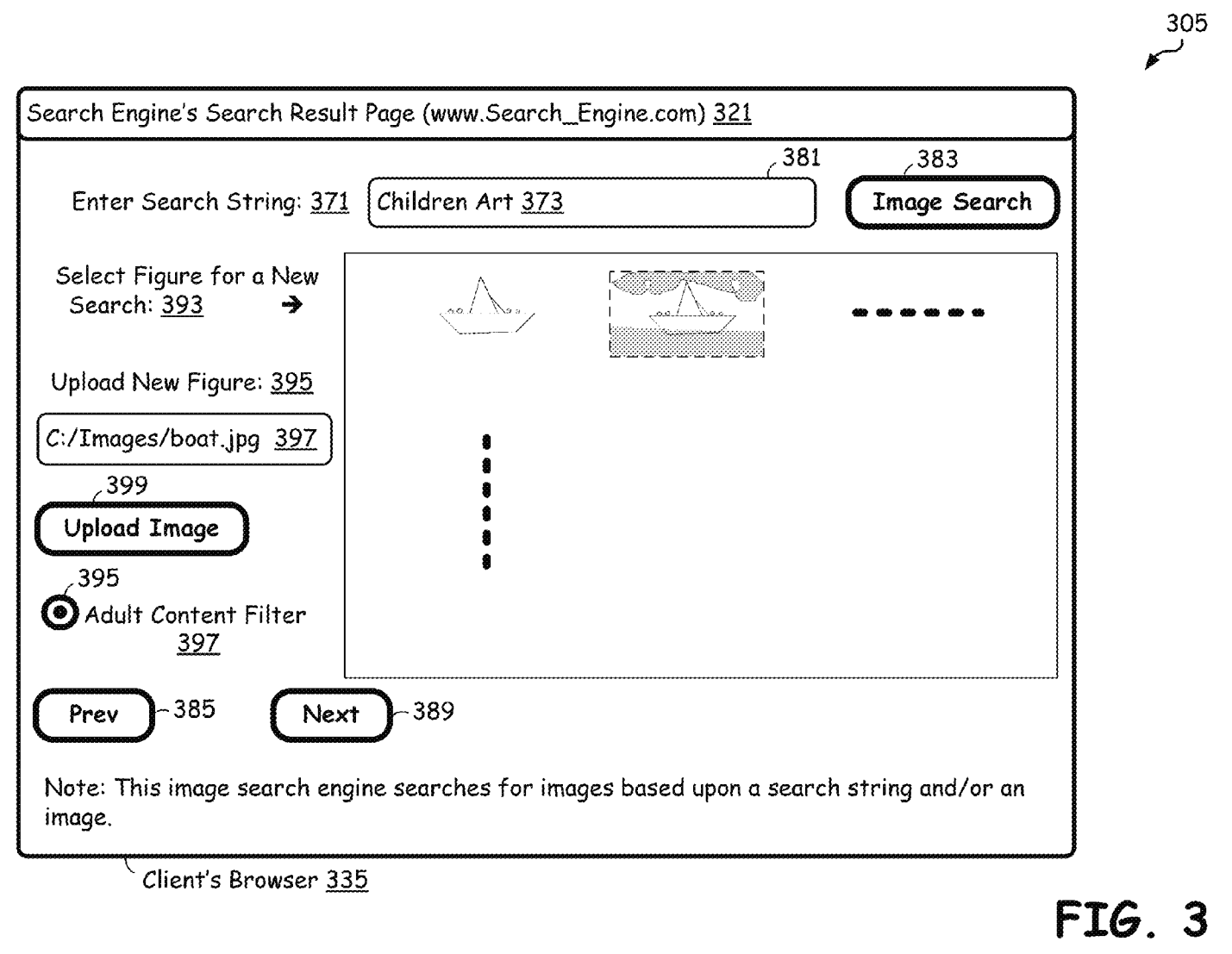

To facilitate searching of images, the image search server 169 provides a web page containing a text box and 'image search' button (refer to 283 and 383 in the FIGS. 2 and 3, respectively). The user may enter the search string 153 in the text box. In addition, another text box provides a user a facility to upload the search image 155, which appears in a search image window of the web page. Alternatively, the user may also cut and paste the search image 155 in the search image window. The user may select or deselect adult content filter button. The settings for the adult content filter may be derived from the settings of the web browser or may be entered through an adult content setting pop-up window. Once either or both of the search string 153 and search image 155 is provided to the web page, the user may click on 'image search' button. The web browser 151, from the client device 157, sends the search string 153 and/or search image 155 to the image search server to further processing as mentioned above.

The search result page contains a series of images delivered by the image search server 169, for example, a set of 16 images; four in each row. The search result page also contains 'prev' and 'next' buttons to access prior displayed search result pages and the subsequent search result pages, respectively. Each of the displayed search result pages contains a certain portion of one of the four possible sorted table contents.

For example, a user may provide a search string 'beach houses' and a search image of a house. Typically, a house image may be a hand drawn image or images of ancient houses of a certain region, modern houses, beach houses, etc. The user may have uploaded a beach house image intending to find more of beach houses of modern interest. Upon clicking 'image search' button, the web browser 151 sends the search string ('beach houses') 153 and search image (of the beach house) 155 to the image search server 169.

The image search server 169 begins processing image of the beach house by extracting characteristic parameter(s) of the image such as, for example and without limitation, pixels, colors of the pixels, strength of the pixels and position of the pixels. Then, the image correlation module 173 correlates the characteristic parameter(s) of the image with the already extracted characteristic parameter(s) of images in the image database 181. Closely correlated images resemble the search image 155 of beach house closely, thus extracting images that are most similar to the user uploaded search image 155. Then, each of the images that are correlated is given a unique image quotient number that represents the closeness to the search image 155 of the beach house. These image quotient numbers are tabled along with image titles and web links, where they were originally located. Then, the table is sorted on the basis of closeness of the images in the image database 181, thus the first image resembling closest to that of the search image (image of the beach house) 155. In addition, in another table, images (that are above a threshold image quotient number, for example, the first two thousand images) that closely correlate with the search image 155 of the beach house are again sorted on the basis of popularity. These sorted images may be filtered by an adult content filter module 175, by using digital image correlation.

In addition, the image text search module 177 matches the words of search string 'beach houses' with the words of the titles of the plurality of images in the image database 181. Each of the matched images in the image database 181 is given a unique text quotient number that represents how closely the words of the search string 153 'beach houses' and the words of the titles of the images in the image database 181 match. This results in images that are closely matched to the words 'beach houses' as having a highest text quotient number. For, example, an image title having exact words 'beach houses' may have text quotient number 100.0000. These text quotient numbers are tabled along with image titles and web links, where they were originally located, and sorted in descending order. In addition, in another table, images (that are above a threshold text quotient number, for example, the first two thousand images) that closely match may again be sorted on the basis of popularity. These sorted images may be filtered by the adult content filter module 175, by using word matching techniques.

Finally, the image listing module 179 lists the images from the four tables to form a plurality of search result pages. Then, the image search server 169 delivers first of these search result pages containing first few search results of each of the tables. The first search result page may contain, for example, a set of 16 images; four in each row. The first row may contain images that closely correlate to that of image of the beach house, the second row may contain the ones that are sorted on the basis of popularity, the third row may contain images, words in the titles of which closely match to the words 'beach houses' and the fourth row may contain images with titles that closely match to the words 'beach houses' and are sorted on the basis of popularity. The search result page also contain 'prev' and 'next' buttons to access prior displayed search result pages and the subsequent search result pages, respectively.

FIG. 2 is an exemplary schematic block diagram illustrating snap shot of an image search page 205 containing 'image search' 283 and 'adult content filter' 285 buttons. Specifically, the exemplary snap shot illustrated shows search engine's web page delivered to web browser 235 of the client device to facilitate user's image search. The search engine's web page delivered may contain a page title such as 'Search Engine's web page (www.Search_Engine.com)' 221, and the 'image search' 283 and 'adult content filter' 285 (along with a text 'Adult Content Filter' 287) buttons.

In addition, text such as 'Enter Search String:' 271 and text box 281 are provided to facilitate user's search. An additional image window is provided for the user to cut and paste or upload search image. Text such as 'Cut and Paste Figure Here:' 271 and 'Upload Figure:' 295 are provided to facilitate user's image search. Helpful note text that informs the user about the functioning of the image search engine, such as 'Note: This image search engine searches for images based upon a search string and/or search image.' may be provided with each of the search engine's web page.

The user may enter the search string in the text box 281, such as 'Children Art' 273. The user may search on the basis of search string alone. The image search server (169 of FIG. 1) provides images, in this case, based upon match in the words of the search string (Children and Art, in this illustration) with that of titles of the images that are stored in the image database (181 of FIG. 1). In addition, the user may provide a search image. This may be done by cutting from some other image tool (painting or image software, for example) and pasting it on to the window provided in the search engine's web page. Alternatively, the user may upload the image to the image window using the upload text box and by providing the address of the image file in the client device ('C:/Images/boat.jpg' 297, in the illustration). The uploaded image appears in the image window once upload image button 299 is clicked.

In addition, the user may select or deselect adult content filter button. The settings for the adult content filter may be provided from the settings of the web browser 235 or may be entered through an adult content setting pop-up window, using a clickable button (not shown in this illustration). Once either or both of the search string 273 and search image are provided to the web page, the user may click on 'image search' button 283. The web browser 235 sends the search string 273 and/or search image to the image search server for further processing.

FIG. 3 is an exemplary schematic block diagram illustrating snap shot of a first search result page 305 of images containing 'image search' 383, 'adult content filter' 395, 'prev' 385, 'next' 389 buttons, and an 'upload new figure' 395 text box; wherein an image is selectable for further image searches. Specifically, the exemplary snap shot illustrated shows a first search result page 305 delivered to web browser 335 of the client device, containing selected searched images, on the basis of a search string/search image. The first search result page delivered may contain a page title such as 'Search Engine's Search Result Page (www.Search_Engine.com)' 321.

Text such as 'Enter Search String:' 371 and text box 381 are provided to facilitate user's further search. An additional image window shows searched images, which are selectable for further search. That is, the image window contains a series of images delivered by the image search server (169 of FIG. 1). For example, the image window illustrated may contain a set of 16 images; in four rows and four columns. Each of the four rows may, for example, contain: (i) images sorted on the basis of closeness in correlation to the search image; (ii) images sorted on the basis of popularity within the first few closely correlated images in (i); (iii) images sorted on the basis of closeness in match between the words in the titles of the plurality of images, in the image database, to that of search string; and (iv) images sorted on the basis of popularity within the first few closely matched images in (iii), respectively. The images in the images window may also have different portions of one of the four possibilities mentioned above, in other embodiments.

The image window facilitates a user to select any of the displayed images for further search. The illustration shows a second image being selected. Once selected, a user may click on the 'image search' button 383 to initiate a new search based upon selected search image and entered search string in the text box 381. The illustration shows a search string in the text box 381 as 'Children Art' 373, a selected image as a second one in the first row. Alternatively, the user may upload a new image to the image window using the upload text box 397, and by providing the address of the image in the client device ('C:/Images/boat.jpg' 397, in the illustration). The uploaded image appears in the image window once an upload image button 399 is clicked. Text such as 'Select Figure for a New Search:' 393 and 'Upload New Figure:' 395 are provided to facilitate initiation of a new image search. The user may select or deselect adult content filter button, before clicking on the 'image search' button 383.

The search result page also contains the 'prev' 385 and 'next' 389 buttons to access prior displayed search result pages and the subsequent search result pages, respectively. By clicking on the title or double clicking on the image, the user may be able watch the corresponding image in its original size in a pop-up window. Helpful note text that informs the user about the functioning of the image search engine of the present invention, such as 'Note: This image search engine searches for images based upon a search string and/or search image.' may be provided with each of the search engine's web page.

Figure 4:
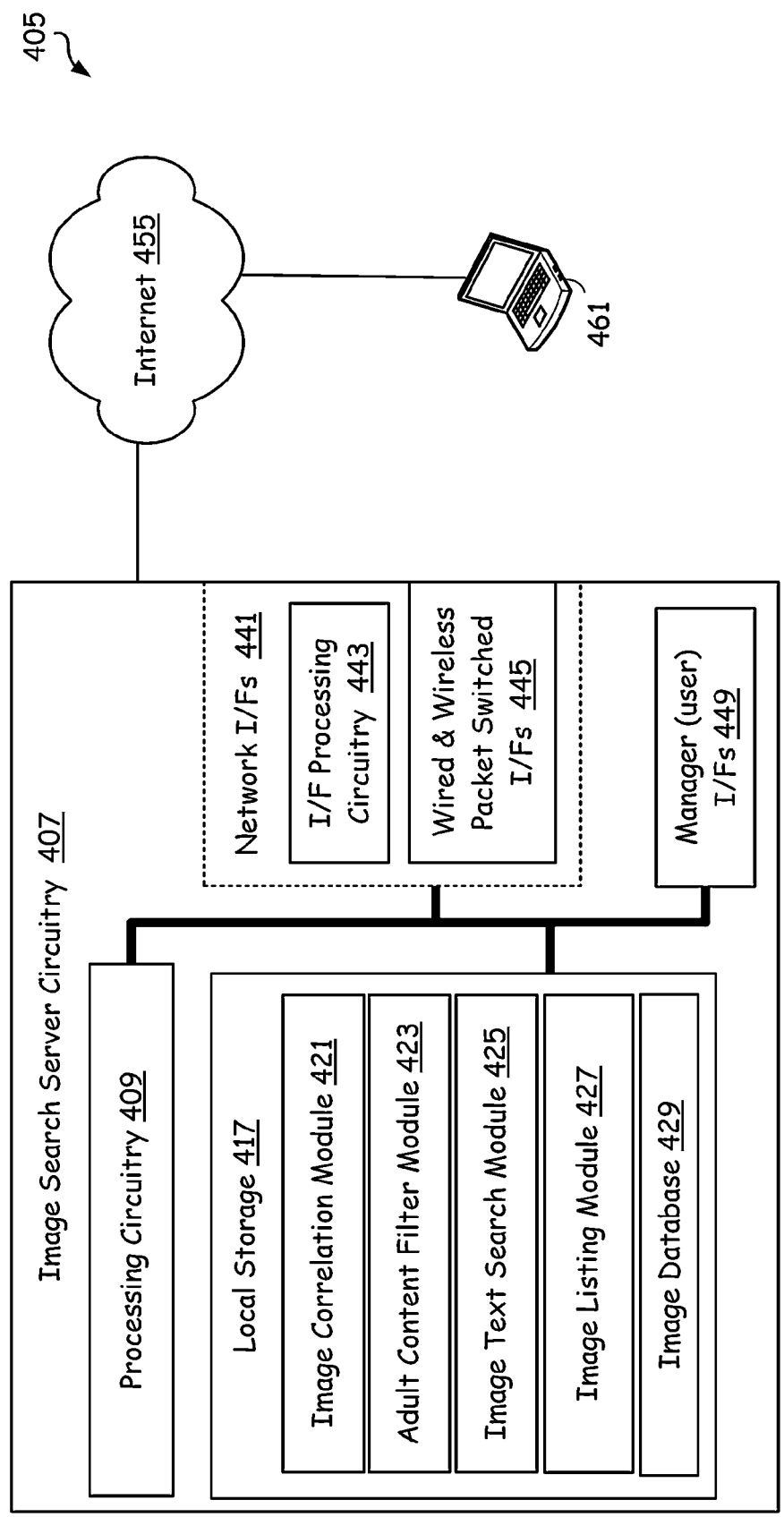
FIG. 4 is a schematic block diagram illustrating exemplary components of the image search server constructed in accordance with the embodiment of FIG. 1 of the present invention.

FIG. 4 is a schematic block diagram illustrating exemplary components of the image search server constructed in accordance with the embodiment of FIG. 1 of the present invention. The image search server circuitry 407 may, in whole or in part, be incorporated into any computing device that is capable of serving as an Internet based server. The image search server circuitry 407 generally includes processing circuitry 409, local storage 417, manager interfaces 449 and network interfaces 441. These components are communicatively coupled to one another via one or more of a system bus, dedicated communication pathways, or other direct or indirect communication pathways. The processing circuitry 409 may be, in various embodiments, a microprocessor, a digital signal processor, a state machine, an application specific integrated circuit, a field programming gate array, or other processing circuitry.

Local storage 417 may be random access memory, read-only memory, flash memory, a disk drive, an optical drive, or another type of memory that is operable to store computer instructions and data. The local storage 417 includes an image correlation module 421, adult content filter module 423, image text search module 425, image listing module 427 and image database 431 to facilitate user's image search, in accordance with the present invention.

The network interfaces 441 contain wired and wireless packet switched interfaces 445 and may also contain built-in or an independent interface processing circuitry 443. The network interfaces 441 allow the image search server 407 to communicate with client devices such as the 461 and to deliver search result pages of images. The manager interfaces 449 may include a display and keypad interfaces. These manager interfaces 449 allow the user at the image search server to control aspects of the present invention. The client device 461 illustrated is communicatively coupled to the image search server 407 via an Internet 455.

The image correlation module 421 performs correlation processing between characteristic parameter(s) of the search image that the web browser of the client device 461 sends and that or those of the plurality of images in the image database 429. For example, the image correlation module 421 may use an intelligent digital image correlation technique to correlate the search image and the plurality of images in the image database 429. In addition, the image correlation module 421 assigns the correlated images in the image database 429 a unique image quotient number that represents the closeness to the search image, and tables the image quotient numbers along with other image related aspects such as image titles and web links. Then, the image correlation module 421 sorts the table on the basis of image quotient number. In addition, the image correlation module 421 sorts in another table the images that are above a threshold image quotient number on the basis of popularity. These sorted images are then filtered by an adult content filter module 423, by using digital image correlation.

An image text search module 425 matches word(s) in the search string and that or those of titles of the plurality of images in the image database 429. Then, the image text search module 425 assigns the images in the image database 429 a unique text quotient number that represents the closeness in match along with other image related aspects such as, for example, image titles and web links. Then, the image text search module 425 sorts the table on the basis of text quotient number. In addition, in another table, the image text search module 425 sorts the images that are above a threshold text quotient number on the basis of popularity. These sorted images are filtered by the adult content filter module 423, by using word matching techniques. Based upon the sorting of images and the filtering, in a representative embodiment, four basic tables are formed. Finally, the image listing module 427 lists the images from the four basic tables to form a plurality of search result pages, each containing a certain portion of each of the four basic, in a mutually exclusive manner so that none of the images in any of the search result pages is repeated.

In other embodiments, the image search server 407 may include fewer or more components than are illustrated as well as lesser or further functionality. In other words, the illustrated image search server is meant to merely offer one example of possible functionality and construction in accordance with aspects of the present invention.

Figure 5:
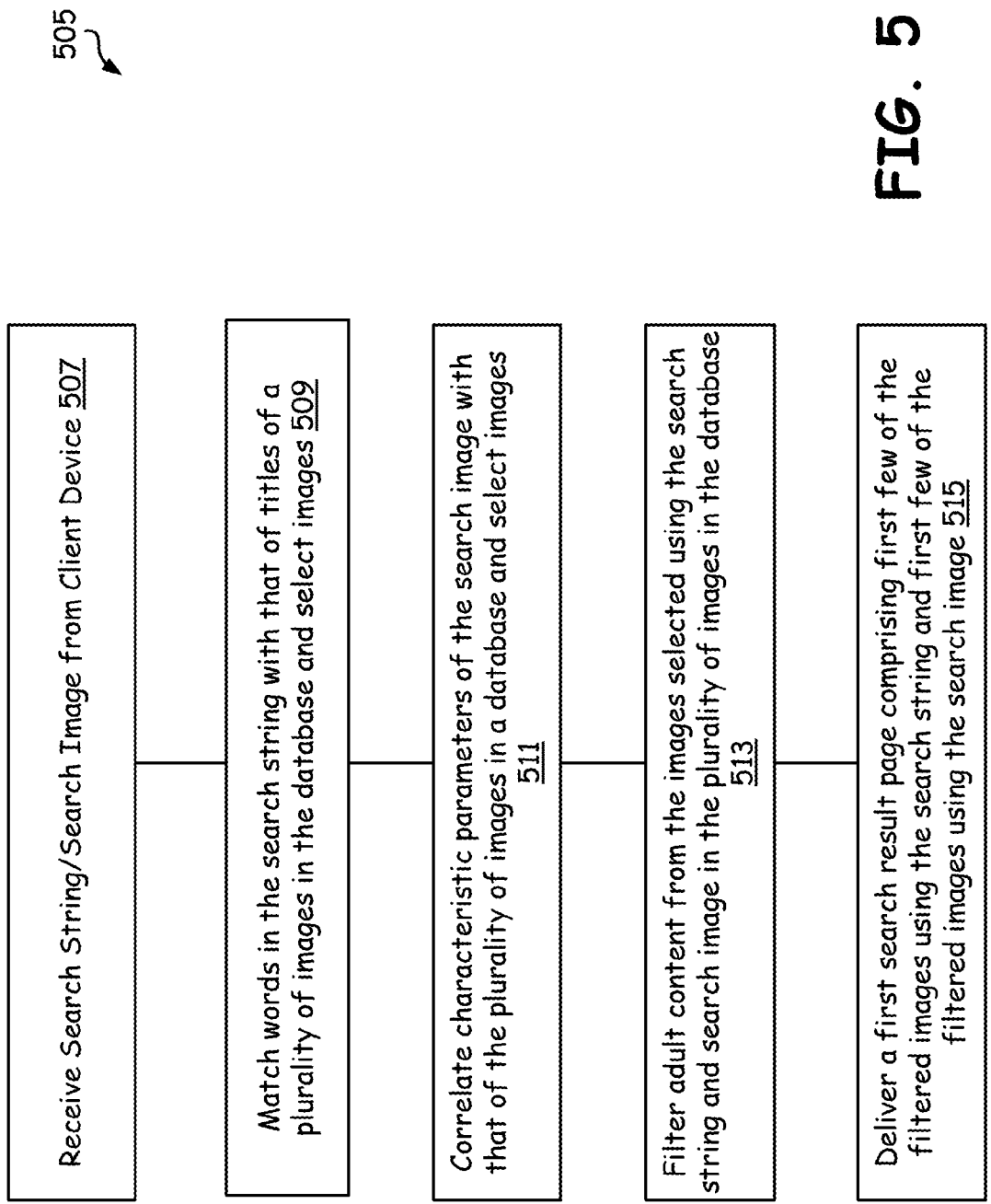
FIG. 5 is a flow diagram illustrating exemplary functionality of the image search server of FIG. 1.

FIG. 5 is a flow diagram illustrating exemplary functionality of the image search server of FIG. 1. The functionality begins at a block 507 when the image search server receives search string and/or search image from the client device. Then, at a next block 509, the image search server matches word(s) in the search string with that or those of titles of a plurality of images in the database and selects images. The process of selecting images involves word matching between the search string and the titles of the images in the database. Then, the process involves generating a table containing columns of images titles and web links associated with the images that are sorted on the basis of closeness in match. The image search server also creates another table that is sorted on the basis of popularity.

At a next block 511, the image search server correlates characteristic parameters of the search image with that of the plurality of images in the database and selects images. The selection process involves creating a table containing image titles and associated web links based upon correlation. The image search server then sorts the table on the basis of closeness in correlation. The image search server also creates another table that is sorted on the basis of popularity. Thus, the image search server creates two or four tables, depending upon the availability of the search string or search image.

Then, at a next block 513, the image search server filters images with adult content from the images selected using search strings and/or search images with adult content. Then, the image search server lists the images selected from the two or four tables to form a plurality of search result pages, each containing a certain portion of each of the two or four tables. At a next block 515, the image search server delivers a first search result page containing a first few of the selected, sorted and filtered images using the search string and a first few selected, sorted and filtered images using the search image.

Figure 6:
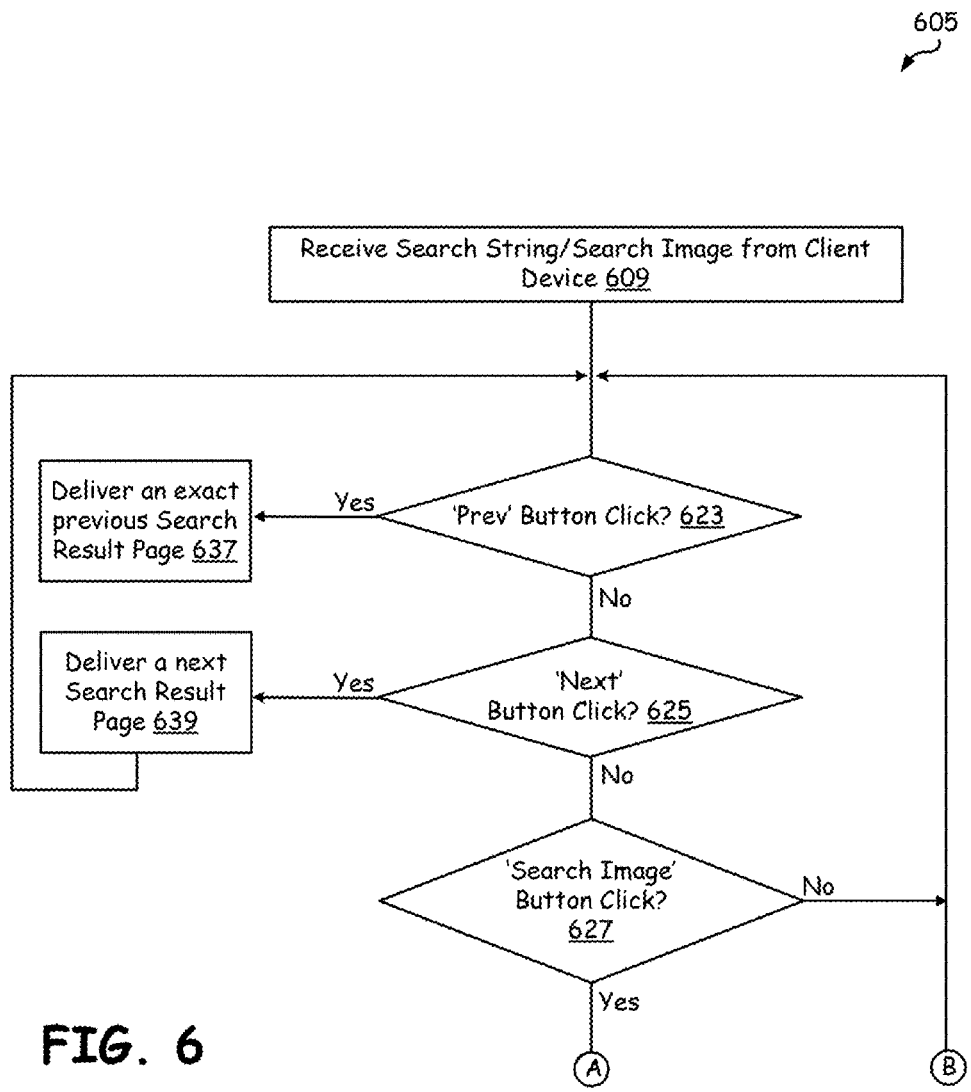
FIG. 6 is a flow diagram illustrating exemplary functionality of the image search server of FIG. 1, in detail.

FIG. 6 is a flow diagram illustrating exemplary functionality of the image search server of FIG. 1, in detail. The detailed functionality begins at a block 609 when the image search server receives a search string and/or a search image from the client device. At a next decision block 623, the image search server verifies if 'prev' button is clicked. The 'prev' button is disabled in a first search result page since there are no previous pages available, and is enabled for subsequent search result pages. If 'prev' button is clicked, at a next block 637, the image search server delivers an exact previous search result page and waits for user response.

If not at the decision block 623, then, at a next decision block 625, the image search server verifies if 'next' button is clicked. If 'next' button is clicked, at a next block 639, the image search server delivers a subsequent search result page. If not at the decision block 625, then, at a next decision block 627, the image search server verifies if 'search image' button is clicked. If not, the image search server awaits for user response. The 'image search' button is clicked only if the user intends to restart another search process by: (i) changing the search string; (ii) uploading a new image into the image window; and/or (iii) selecting an image in the image window (among the displayed images of a search result page). If yes at the decision block 627, then the process of selection of images that match the search criteria continues at 'A' (refer to the FIG. 7, for continuation from 'A').

Figure 7:
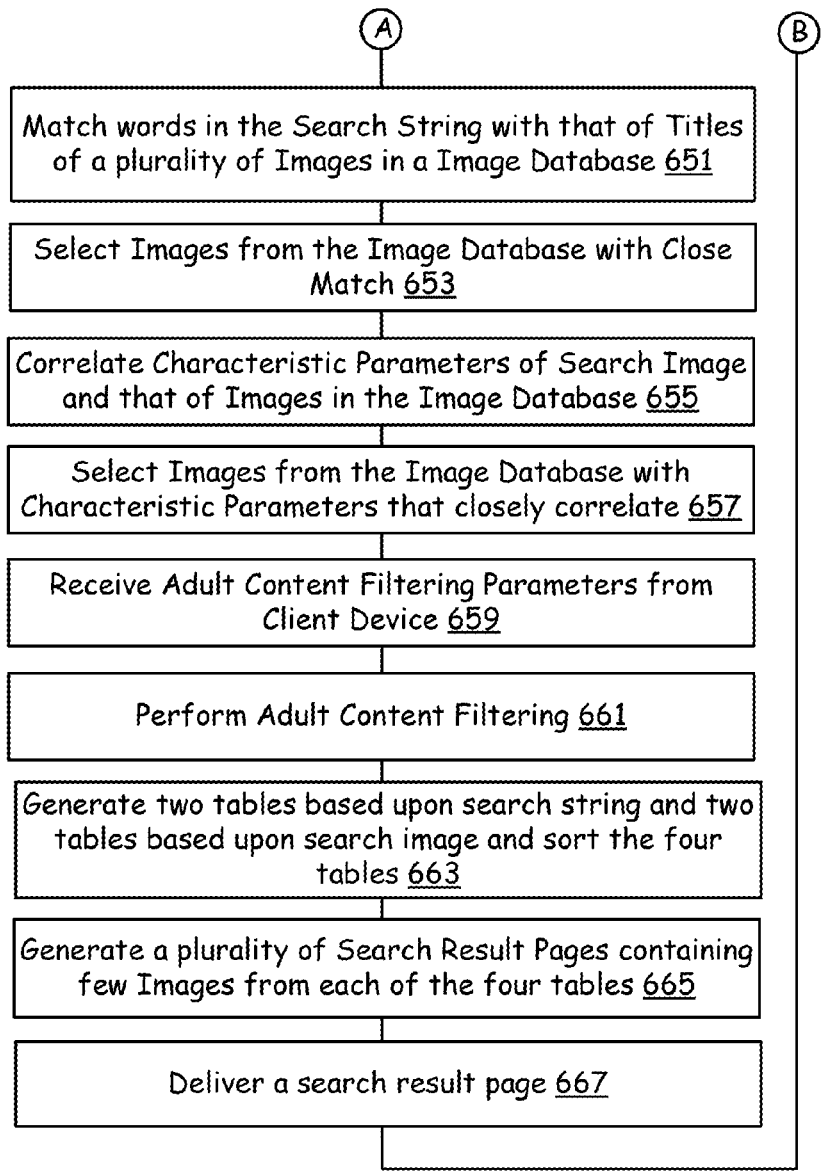
FIG. 7 is a flow diagram illustrating exemplary functionality of the image search server of FIG. 1, in continuation of the FIG. 6.

FIG. 7 is a flow diagram illustrating exemplary functionality of the image search server of FIG. 1, in continuation of the FIG. 6. If yes at the decision block 627 (in FIG. 6), continuing at 'A', the image search server matches word(s) in the search string with that or those of titles of a plurality of images in the database. Then, at a next block 653, the image search server selects images from the image database that closely match (for example, above predetermined threshold). The process of selecting images starts when the matched images in the image database are given a unique text quotient number (that determines how closely the words of the search string and the words of the titles of the images in the image database match). Then, the image search server generates a table containing columns of images titles, web links associated with the images and text quotient numbers. The image search server then sorts the table on the basis of text quotient number. The image search server also creates another table that contains images titles, web links associated with the images and text quotient numbers (above a threshold text quotient number) that is sorted on the basis of popularity.

At a next block 655, the image search server correlates characteristic parameter(s) of the search image with that of the plurality of images in the database. Then, at a next block 657, the image search server selects images from the image database that closely correlate (for example, above predetermined threshold). The image selection process using the search image starts when the image search server provides a unique image quotient number (that represents the closeness of each image in the database to that of the search image, based upon correlation). Then, the image search server creates a table containing image titles, associated web links and image quotient numbers among other columns. The image search server then sorts the table on the basis of image quotient numbers. In another table, the image search server sorts the first few images that are above a threshold image quotient number on the basis of popularity. Thus, the image search server creates two or four tables, depending upon the availability of the search string or search image.

Then, at a next block 659, the image search server receives adult content filtering parameter(s) from the client device. The adult content filtering parameter(s) may be received when a search process is initiated or any time after that. At a next block 661, the image search server performs filtering of images with adult content from the images selected using search strings and/or search images with adult content.

At a next block 663, the image search server generates two tables based upon search string and two tables based upon search image and the sorts the four tables. The sorting of tables is based upon text quotient number and image quotient number. Then, at a next block 665, the image search server lists the images from the four tables to form a plurality of search result pages, each containing a certain portion of each of the two or four tables. The image search server generates this listing in a mutually exclusive manner so that none of the images in any of the search result pages is repeated. At a next block 667, the image server delivers a search result page. Then, the image search server waits for user response, at 'B' (refer to FIG. 6). This process continues till user abandons the search.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method performed by an image search infrastructure that supports delivering of images to a client device containing a web browser, the method comprising:

receiving a search string and a search image from the client device's web browser;

selecting a first set of images from a plurality of images, the plurality of images having been identified along with associated text during a web crawling process, the first set of images comprising images with associated text that matches words of the search string:

selecting a second set of images from the plurality of images, the second set of images comprising images having characteristic parameters that are similar to the characteristic parameters of the search image;

generating a plurality of tables, wherein a first table is generated based on the search string with each first table entry identifying a corresponding image of the first set of images and a second table is generated based on the search image with each second table entry identifying a corresponding image of the second set of images;

sorting the plurality of tables to generate a plurality of sorted tables; and delivering a first search result page comprising at least a first portion of the first set of images and at least a second portion of the second set of images, wherein the first search result page includes images selected based on the plurality of sorted tables.

2. The method of claim 1, further comprising performing adult content filtering.

3. The method of claim 2, wherein the performing of the adult content filtering being responsive to an adult filtering selection made via the web browser.

4. The method of claim 1, further comprising analyzing the plurality of images and the search image to identify the characteristic parameters.

5. The method of claim 4, wherein the analysis of the plurality of images occurs in advance of receiving the search image.

6. An image search infrastructure that supports a delivery of images selected from a plurality of images to a client device with a web browser, the plurality of images and associated text being identified in a web crawling process, the image search infrastructure comprising:

a communication interface;

a processing infrastructure that receives via the communication interface a search string and a search image;

the processing infrastructure being capable of identifying both a first set of images and a second set of images, the first set of images being identified by:

comparing the search string with the associated text of the plurality of images, and the second set of images being identified by comparing characteristics of the search image with characteristics of the plurality of images;

generating a first table based on the search string with each first table entry identifying a corresponding image of the first set of images and a second table based on the search image with each second table entry identifying a corresponding image of the second set of images;

sorting the first table and the second table to generate sorted first and second tables; and the processing infrastructure delivers, based on the sorted first and second tables, at least one of the first set of images and the second set of images via the communication interface.

7. The image search infrastructure of claim 6, wherein the delivery comprises images that pass an adult content filtering process.

8. The image search infrastructure of claim 7, wherein the adult content filtering process is selected to be applied in response to a user setting indication.

9. The image search infrastructure of claim 6, wherein the processing infrastructure analyzes the plurality of images and the search image to identify the characteristic parameters.

10. The image search infrastructure of claim 9, wherein the analysis of the plurality of images occurs in advance of receiving the search image.

11. The image search infrastructure of claim 5, further comprising storage that has both a first data structure and a second data structure, the first data structure containing data relating to the characteristics of the plurality of images, and the second data structure containing the associated text.

12. An image search infrastructure that supports deliveries of images selected from a plurality of images to a plurality of client devices, the plurality of images and associated text being identified in a web crawling process, the image search infrastructure comprising:

a communication interface;

a processing infrastructure that receives via the communication interface a plurality of search input from the plurality of client devices, each of the plurality of search input comprising at least one of a search string and a search image;

the processing infrastructure responds to a first of the plurality of search input via a text matching process to generate a first search results containing first images;

the processing infrastructure further configured to:

generate a plurality of tables, wherein a first table is generated based on at least one search string with each first table entry identifying a corresponding image identified based upon the at least one search string and a second table is generated based on at least one search image with each second table entry identifying a corresponding image identified based upon the at least one search image;

sort the plurality of tables to generate a plurality of sorted tables; and the processing infrastructure responds to a second of the plurality of search input via an image characteristics matching process to generate a second search results containing second images, wherein the second images comprise images selected based on the plurality of sorted tables.

13. The image search infrastructure of claim 12, wherein the processing infrastructure responds to a third of the plurality of search input by delivering images generated using both the text matching process and the image characteristic matching process.

14. The image search infrastructure of claim 12, wherein the processing infrastructure applies an adult content filtering process in response to a user setting.

15. The image search infrastructure of claim 12, wherein the processing infrastructure analyzes the plurality of images to identify image characteristic parameters in advance of receiving the plurality of search input.

16. The image search infrastructure of claim 15, further comprising storage that has both a first data structure and a second data structure, the first data structure containing image characteristic parameters of the plurality of images, and the second data structure containing the associated text.

17. The image search infrastructure of claim 12, wherein at least one of the first search results and the second search results are sorted based on at least one factor.

18. The image search infrastructure of claim 17, wherein the at least one factor comprises a popularity factor.

19. The image search infrastructure of claim 12, wherein the second search results are sorted based on how close image characteristics of the search image match as determined by the image characteristics matching process.

20. A method performed by an image search infrastructure that supports deliveries of images selected from a plurality of images to a plurality of client devices, the plurality of images and associated text being identified in a web crawling process, the method comprising:

receiving via the communication interface a plurality of search input from the plurality of client devices, each of the plurality of search input comprising at least one of a search string and a search image:

generating, using a text matching process, a first search results containing first images, wherein the text matching process comprises generating a first table based on the search string with each first table entry identifying a corresponding image of the first images;

generating, using an image characteristics matching process, a second search results containing second images, wherein the image characteristics matching process comprises generating a second table based on the search image with each second table entry identifying a corresponding image of the second images;

sorting the first table and the second table to generate first and second sorted tables; and delivering the first search results and the second search results, based at least in part on the first and second sorted tables.

21. The method of claim 20, wherein the first search results and the second search results are both delivered to a first device of the plurality of client devices.

22. The method of claim 21, wherein the first device produces a single visual image that contains at least portions of both of the first search results and the second search results.

23. The method of claim 20, further comprising responding to a user selection via one of the plurality of user devices by performing adult content image filtering.

24. The method of claim 20, further comprising analyzing the plurality of images to identify image characteristic in advance of receiving the plurality of search input, the image characteristics being used in the image characteristics matching process.

25. The method of claim 20, further comprising storing in a first data structure image characteristic parameters of the plurality of images; and storing in a second data structure the associated text.

26. The method of claim 20, further comprising sorting, based on at least one factor, at least one of the first search results and the second search results.

27. The method of claim 26, wherein the at least one factor comprises a popularity factor.

28. The method of claim 20, wherein the second search results are sorted based on closeness of matching as determined by the image characteristics matching process.

* * * * *